United States Patent Office 3,606,241
Patented Sept. 20, 1971

3,606,241
HYDRAULICALLY DAMPED MAGNETIC VALVE
Siegfred Bornholdt, Lohr, Germany, assignor to
Danfoss A/S, Nordborg, Denmark
Filed June 3, 1969, Ser. No. 832,038
Claims priority, application Germany, May 4, 1968,
P 17 50 470.0
Int. Cl. F16k 31/06
U.S. Cl. 251—52                                6 Claims

ABSTRACT OF THE DISCLOSURE

The invention relates to a hydraulically damped magnetic valve having an oil chamber in which the armature and coil are enclosed. The oil chamber is formed by diaphragms attached to the valve spindle, at opposite ends of the armature, and to the interior wall of the housing. Two gas chambers are formed interiorly of the housing on opposite sides of the oil chamber. A passage is formed in the valve spindle which extends from the valve chamber to one of the gas chambers to effect balancing which is concomitant with low closing spring forces.

Figure 1:
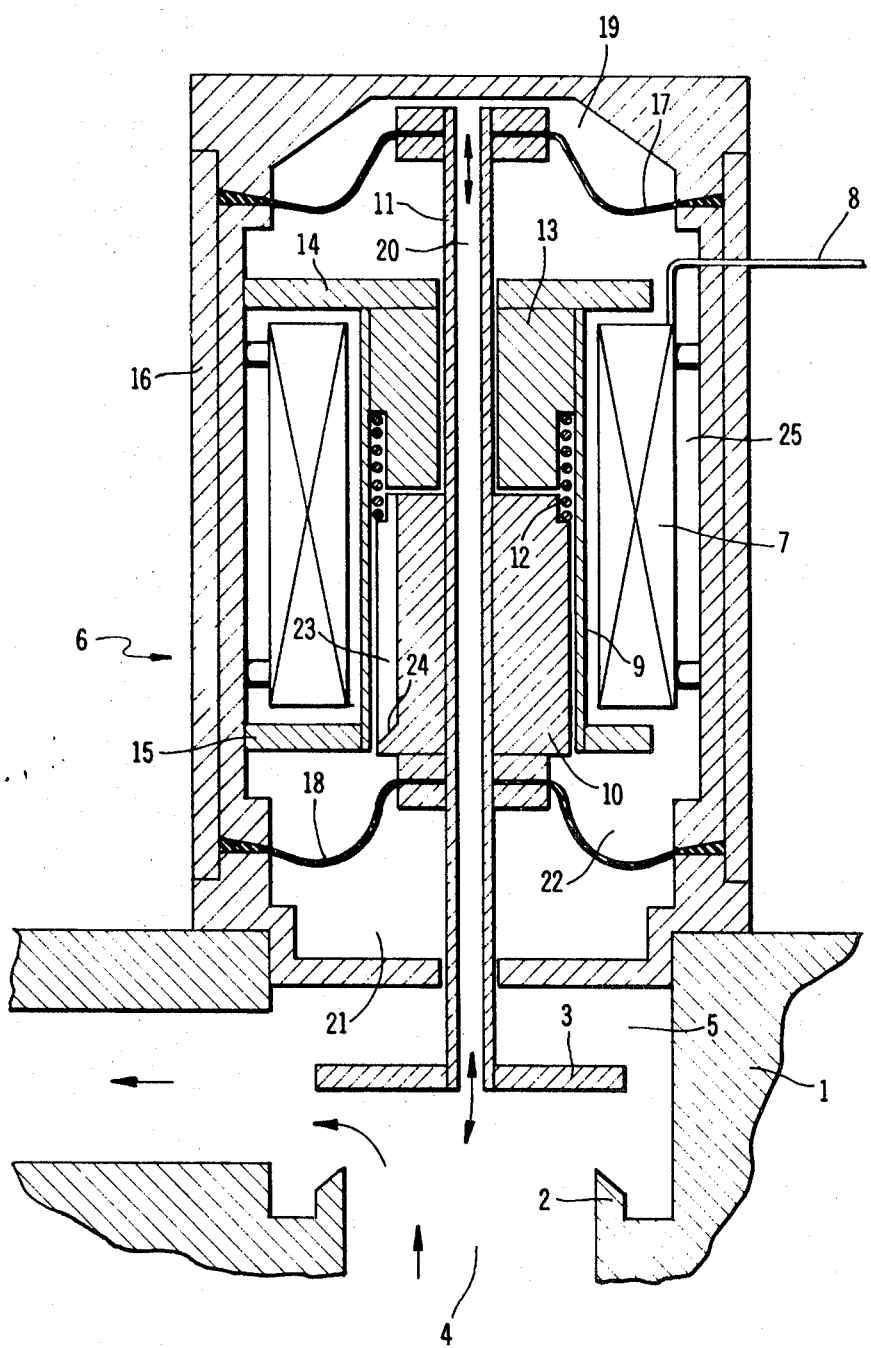

The invention relates to a hydraulically damped magnetic valve, particularly for gases, and wherein an oil chamber, in which moves an armature biased by a closing spring, is sealed by a diaphragm on that side facing the valve chamber.

In hydraulically damped magnetic valves of this kind, movement of the armature causes oil to be displaced, through a throttle passage, from one end-wall to the other, so that the movement of the armature is damped. Here, the diaphragm not only acts as a seal, but, by stretching to an appropriate extent, also keeps the volume of the oil chamber constant. The force for stretching the diaphragm must be applied by the magnet.

These difficulties are not encountered in another construction wherein an oil chamber, divided by a diaphragm having a throttle passage, is fitted on that side of the electromagnet remote from the valve and the armature is connected to the diaphragm by a rod forming an exial extension of the armature. Here however, the space occupied by the armature is not sealed off from the valve chamber.

Magnetic valves generally require a closing spring which when the magnet is not properly energized, brings the closure member to a prescribed working position, usually the closed position. This closure member has to be so strong that it keeps the valve closed under all conditions, for example, even when a very low discharge pressure is opposed to a very high supply pressure acting against the pressure exerted by the closing spring. A strong closing spring however also requires a correspondingly strong electromagnet to effect opening.

Pressure-relieved magnetic valves are in fact known wherein two diaphragms compensate the pressures acting on the closure member. In a known construction, the valve spindle, linked to the armature, is extended beyond the closure member and through the valve seat. The two diaphragms are secured on the spindle on both sides of the valve seat and close the supply and discharge chambers respectively. In magnetic valves of this kind difficulties arise however in effecting hydraulic damping.

The object of the invention is to provide a magnetic valve, which is hydraulically damped so that it operates with little noise and uses very low closing-spring forces.

This object is achieved by using as a basis a hydraulically damped magnetic valve as described above, and, in accordance with the invention, this valve is characterized in that the oil chamber is sealed by a diaphragm on that side remote from the valve chamber, and the space on the other side of the diaphragm is connected to the valve chamber below the closure member by way of a passage, for the purpose of relieving pressure.

In this construction, complete relief is obtained with the help of two diaphragms which also enclose the oil chamber. Since the oil chamber is bounded on both sides by a diaphragm, these diaphragms need only to be able to follow the movement of the spindle but do not however need to undergo appreciable deformation to match the volume of the oil chamber. The magnet, its damping device and the relief device are arranged on one side of the closure member and can therefore be accommodated in a common valve attachment.

This magnetic valve operates with extremely little noise as a result of the hydraulic damping. Because of the load-relief and the oil chamber bounded by two diaphragms, very small forces are required for opening and closing. Consequently, relatively small magnets can be used. The valve is largely unaffected by the position in which it is fitted.

In a preferred embodiment a bore is provided as the connecting passage in the valve spindle.

It is also advantageous if the armature contains a longitudinal groove which is closed shortly before the upper end position is reached. The longitudinal groove then forms a throttle passage of relatively large cross-section, so that the valve can initially open rapidly. The cross-section of the throttle is then reduced so that the valve moves slowly into the upper end position.

In a further aspect of the invention, the armature and valve spindle can be movable relatively to each other, a spring acting on the spindle in the direction for opening being interposed, and a throttle can be provided in the connecting passage. In this arrangement, the armature and the valve are separately damped. The armature is still hydraulically damped; it can move upward rapidly and is braked only shortly before reaching the upper end position. During the opening movement, the valve compresses the gas in the upper relief chamber. Up to a prescribed point, the valve opens rapidly and is then braked by the build-up of gas in the upper relief chamber.

It is also expedient to provide the closure member in known manner with a throttle element which is effective in the first part of the opening movement. In this way, the valve can execute a relatively large stroke up to the beginning of the braking action, without the valve having, in the meantime, uncovered too great an opening cross-section. It is desirable for only about 25% of the cross-section to be uncovered during the rapid opening movement, and for this to be followed by a slow opening movement so as to prevent noisy ignition of the gas.

Figure 2:
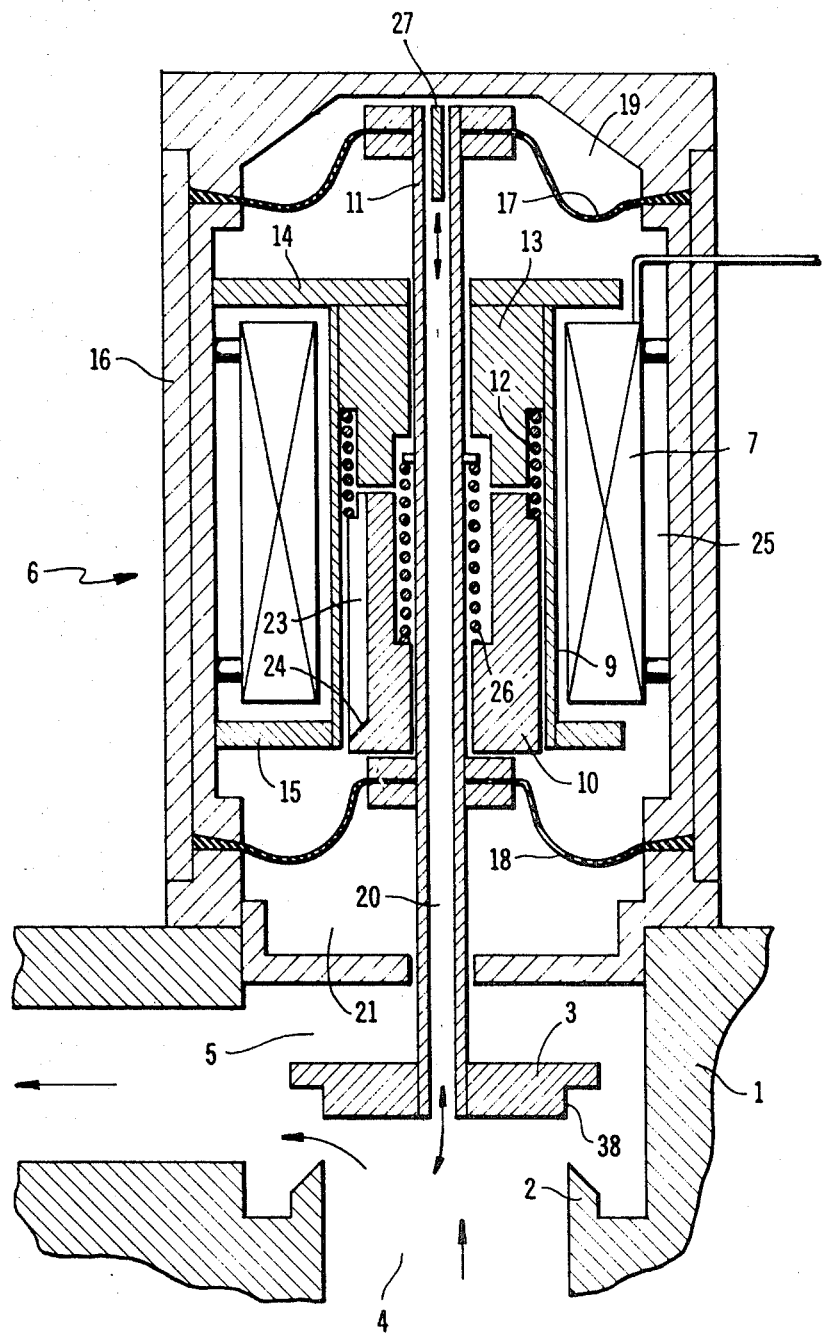

The invention will now be described in more detail by reference to two embodiments illustrated in the drawing wherein:

FIG. 1 shows schematically a longitudinal section through a first embodiment of the invention wherein the opening position of the valve is shown; and FIG. 2 is a similar illustration of a second embodiment of the invention.

In FIG. 1, the valve housing 1 has a valve seat 2, which co-operates with a closure member 3. Below the closure member is located a supply chamber 4 and above this is the discharge chamber 5. The valve housing has an attachment 6 in which the entire actuating mechanism is contained.

The attachment contains a magnetic coil 7, with appropriate leads 8 and mounted on a spool 9. Guided in the spool is an armature 10 which is firmly connected to the valve spindle 11 which carries the closure member 3. A closing spring 12, which is supported on a magnetic plug 13, acts on the armature 10. The magnetic short circuit is through two magnetic plates 14 and 15 and the outer housing 16.

The valve spindle carries, above and below the magnet, diaphragms 17 and 18 respectively, the peripheral edge of each of which is clamped in the housing. Above the upper diaphragm 17 is an upper relief chamber 19, which communicates with the supply chamber 4 through a bore 20 in the valve spindle. Below the lower diaphragm 18 is a lower relief chamber 21 which communicates with the discharge chamber 5. The space 22 between the diaphragm 17 and 18 is filled with oil. The armature contains a longitudinal groove 23, which is closed at its lower end 24.

When the valve is in its closed position, the supply pressure acts on the under-face of the closure member 3 and at the same time on the upper-face of the diaphragm 17. The diaphragm is so rated, that the force applied thereto is roughly equal to the pressure applied to the effective portion of the closure member 3. Similarly, the discharge pressure acts on the upper face of the closure member 3 and the lower face of the diaphragm 18. When the magnet 7 is switched in, the armature 10 is drawn upwards. Here, due to the load-relief described, only the force applied by the closing spring 12 and the force of gravity have to be overcome. The initial closing movement proceeds rapidly, since the oil can be displaced along the longitudinal groove 23. Shortly before the upper end position is reached, this groove comes to an end. Oil can then only be displaced through the narrow gap around the armature 10. This leads to pronounced braking, so that the armature moves against the magnetic plug 13 slowly and therefore with little noise. The closing movement, when the magnet is switched off, takes place substantially under the action of the weak closing spring 12 and the dead weight of the moving parts.

In the embodiment illustrated, the portions of the oil chamber adjacent the diaphragms 17 and 18 not only communicate with each other through a central passage accommodating the spindle, but through an outer passage 25. It will be seen that the space between the two diaphragms 17 and 18 changes at most to an insignificant extent when the shaft moves.

In the embodiment seen in FIG. 2, like parts are given the same reference numerals as in FIG. 1. The important difference is that the armature 10 and the spindle 11 are movable relatively to each other and are interconnected by a coupling spring 26, which is supported at one end on the armature and at the other on the valve spindle. Also, a throttle insert 27 is provided in the passage 20. Finally, the closure member carries a throttle element 28 which engages in the valve seat 2.

In this construction, the relief device and the hydraulic damping device operate in the same way as in the embodiment of FIG. 1. When, however, the magnet 7 is switched in, the armature 10 moves upwards without the movement of the closure member immediately following the movement of the armature. Rather, the closure member is pressed upwards under the action of the spring 26, but is subjected to separate braking by the build-up of gas in the relief chamber 19, which is caused by the throttle insert 24, this braking action starting after a predetermined stroke. This stroke is such that the throttle element 28 just begins to move away from the valve seat 2. Thus, independently of the armature movement, the valve opens rapidly up to a point at which a predetermined small cross-section is reached, and the opening movement then proceeds slowly. Differences in the movement of the armature, e.g. as a result of excess voltage or a drop in voltage, are scarcely noticed during the movement of the closure member. The closing movement of the armature and the closure member is effected by relatively weak spring-forces and requires no further explanation.

I claim:

1. A hydraulically damped magnetic valve assembly comprising, a housing defining a solenoid chamber and a valve chamber, a valve seat in said valve chamber, a valve having a closure member in said valve chamber and a spindle extending from said valve chamber into said solenoid chamber, a spool fixedly mounted in said solenoid chamber, a magnetic coil surrounding said spool, an armature connected to said spindle and guided by said spool for moving said valve in one direction upon being actuated, resilient means biasing said armature in the nonactuating direction, said solenoid chamber being divided into two end chambers and a middle chamber by two diaphragms attached to opposite ends of said spindle and said housing, said two chambers being respectively identified as remote and adjacent chambers relative to said valve closure member, said spool and said armature being in said middle chamber, said middle chamber being filled with oil, and a passage connecting said valve chamber with said remote chamber.

2. A hydraulically damped magnetic valve assembly according to claim 1 wherein said passage is in said valve spindle and extends through said valve closure member to said remote chamber.

3. A hydraulically damped magnetic valve assembly according to claim 1 wherein said armature has a longitudinally extending slot which terminates near one end of said armature, said spool being of a length so as to overlap said slot when said armature is axially displaced to an extreme position.

4. A hydraulically damped magnetic valve assembly according to claim 1 wherein said armature and said spindle are relatively movable and have resilient means disposed therebetween for biasing said armature in said nonactuating direction.

5. A hydraulically damped magnetic valve assembly according to claim 2 in which throttle means are disposed in said passage.

6. A hydraulically damped magnetic valve assembly according to claim 1 wherein said valve closure member has throttle passage means cooperable with said valve seat to effect an initial quick opening of said closure member.

References Cited

UNITED STATES PATENTS

| 2,826,215 | 3/1958 | Wolfslau et al. | 251—282X |
| 2,923,521 | 2/1960 | Ray | 251—129X |
| 3,108,777 | 10/1963 | Ray | 251—129X |
| 3,329,165 | 7/1967 | Lang | 251—129X |
| 3,441,246 | 4/1969 | Lauppe et al. | 251—52 |
| 3,472,483 | 10/1969 | Janczur | 251—129 |

ARNOLD ROSENTHAL, Primary Examiner

U.S. Cl. X.R.

251—129